Figure 1:
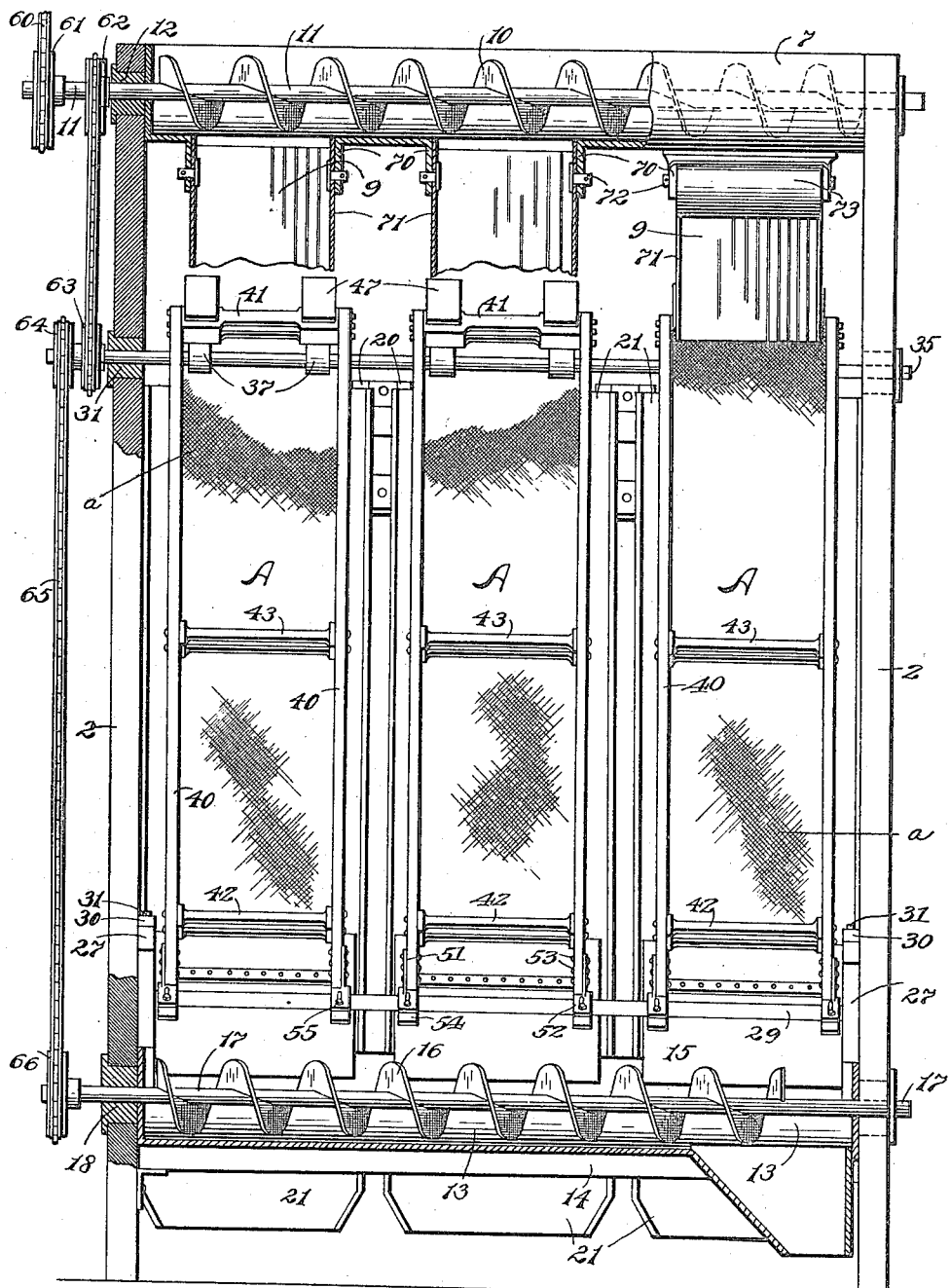

C. C. RUPRECHT.
SEPARATING APPARATUS.
APPLICATION FILED JAN. 7, 1915.

1,222,804.

Patented Apr. 17, 1917.
3 SHEETS—SHEET 1.

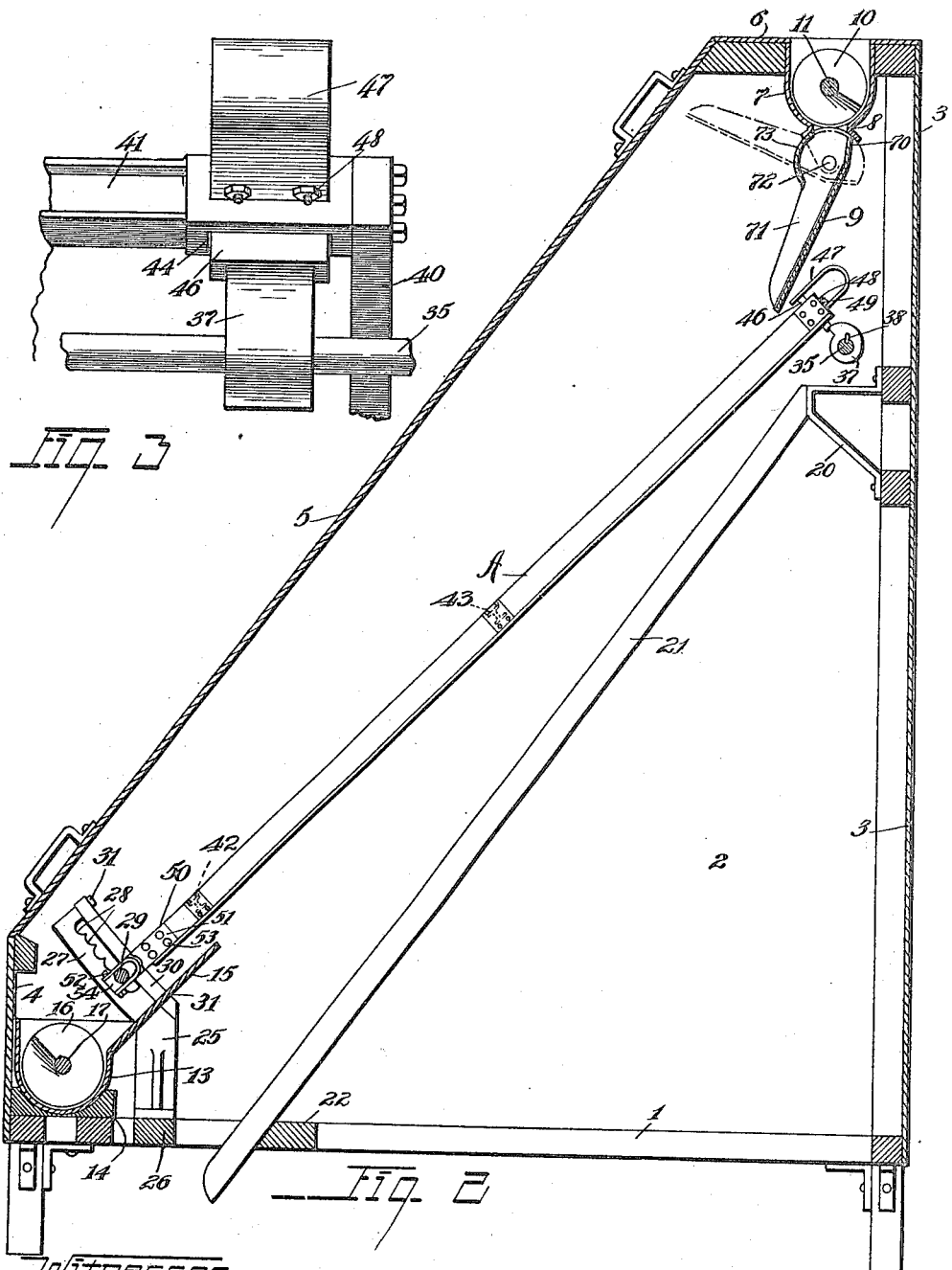

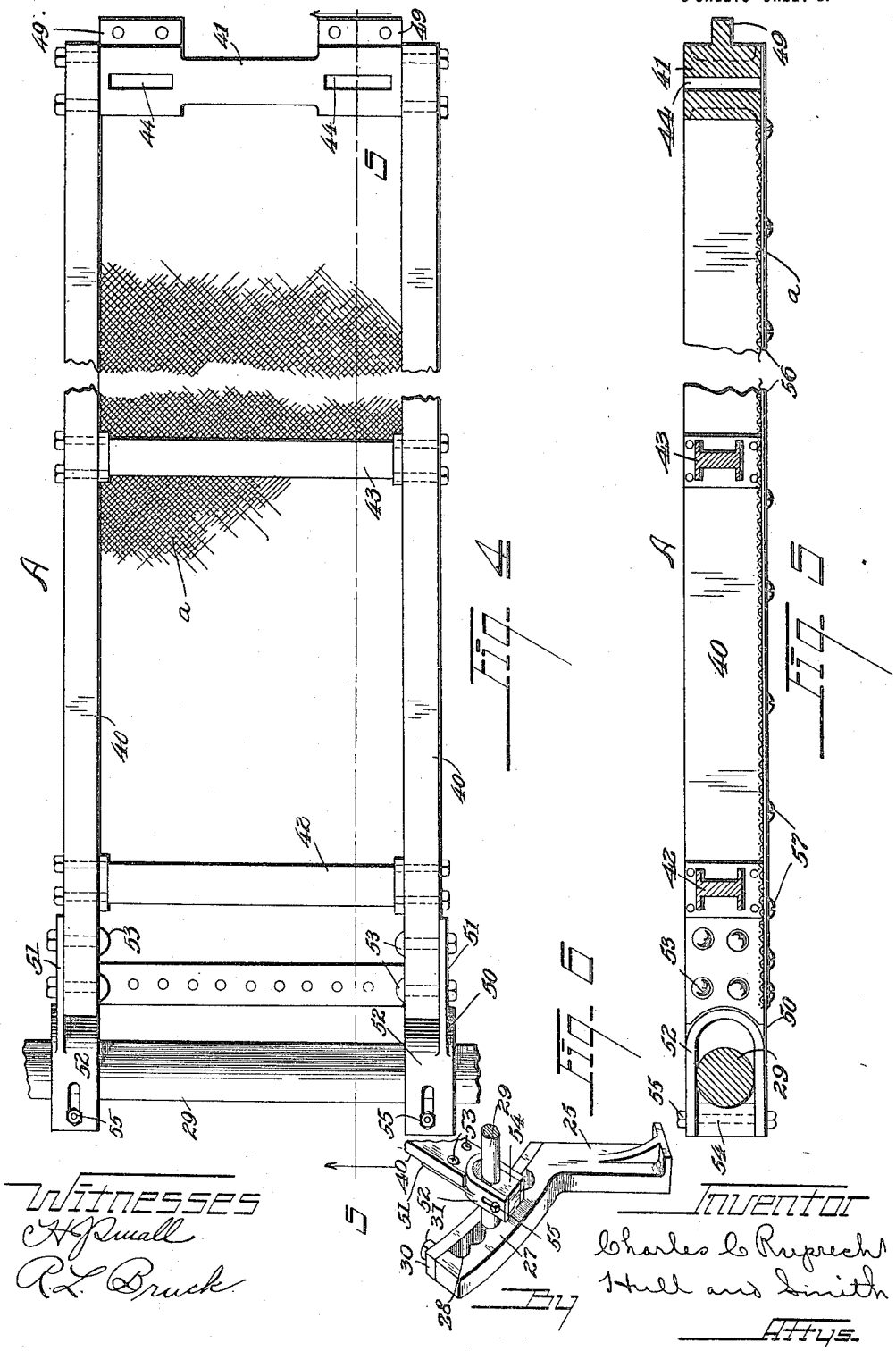

UNITED STATES PATENT OFFICE.

CHARLES C. RUPRECHT, OF MIDWAY, FLORIDA.

SEPARATING APPARATUS.

1,222,804.  Specification of Letters Patent.  Patented Apr. 17, 1917.

Application filed January 7, 1915. Serial No. 884.

*To all whom it may concern:*

Be it known that I, CHARLES C. RUPRECHT, a citizen of the United States, residing at Midway, in the county of Gadsden and State of Florida, have invented a certain new and useful Improvement in Separating Apparatus, of which the following is a full, clear, and exact description, reference being had to the accompanying drawings.

This invention relates to apparatus for grading or separating fullers' earth or other similar materials, and it has for its object to provide an apparatus for this purpose that is extremely efficient; that is simple of construction and economical of operation and maintenance; wherein repairs can be conveniently made without the necessity of stopping the operation of the entire apparatus; and wherein the screens are kept clean and comparatively free from clogging.

In those types of grading or separating apparatus that are in common use and with which I am familiar, the screen is made in one section and so arranged that it is very difficult of removal for the purpose of making repairs, and when it is necessary to remove a screen, the entire apparatus is thrown out of service during such time. In many cases the supply of material is taken directly from other devices, such as driers, grinders, etc., and to suspend their operations while making repairs on the screen, results in a considerable loss of time, which means an expense far in excess of the actual cost of repairing the screen.

Therefore, I hold as a very important object of my invention, the provision of a grading or separating apparatus wherein the aforesaid difficulty is eliminated. To this end I provide apparatus which comprises, generally, a series of inclined screens (which I will refer to hereinafter as screen-panels) to the upper ends of which is delivered, by a common means, material to be graded, the material that is fine enough passing through the screens, while the coarser material is discharged from the lower ends of the screen-panels into a suitable receiver. Pursuant to the aforesaid objects, I provide means for cutting off the supply of material to any one of the panels, and each panel is supported entirely independently of the other panels and in a manner that will permit it to be very readily removed from the apparatus for the purpose of repairs.

A further object comprehended by my invention is the provision of a simple and convenient means of adjustment for varying the angle of inclination of the screen panels.

The foregoing objects, and others which will become apparent as this description proceeds, are attained in an apparatus comprising the elements set forth in the claims annexed hereto, and an embodiment whereof is shown in the accompanying drawings, wherein Figure 1 represents a sectional front elevation of the apparatus; Fig. 2 is a vertical section through the apparatus, on a plane at right angles to Fig. 1; Fig. 3 is a rear elevation of an upper corner of one of the panels, and the vibrating mechanism associated therewith; Fig. 4 is a plan and Fig. 5 a longitudinal section on the line 5—5 of Fig. 4 respectively, of one of the screen-panels employed in my apparatus; and Fig. 6 is a perspective of one of the brackets used in supporting the lower ends of the screen-panels.

Referring to the drawings by use of reference characters, 1 represents the base frame of a casing, and 2 the end walls thereof. A back wall 3 rises from the rear edge of the base 1, and a front wall 4, from its forward edge. A suitable closure 5 extends between the upper edge of the front wall 4 and the forward edge of a top wall 6.

A conveyer trough 7 occupies the upper portion of the casing and is open at its top to receive material to be graded; and throughout its length, said trough is provided with depending spouts 8 that are provided with pivoted chutes 9, adapted to discharge material upon screen-panels A. These spouts and chutes will be fully described hereinafter. A spiral conveyer 10 operates within the trough, and its shaft 11 is journaled in suitable bushings 12 that are mounted in the end walls of the casing. A similar conveyer trough 13 is located in the lower, forward portion of the casing, and is supported by a framework 14. This conveyer trough is arranged to receive the material discharged from the lower ends of the screen-panels A and in order to prevent any of the material from escaping the trough, said trough may be provided with laterally extending inclined plates 15, which project beneath the lower ends of said panels. A spiral conveyer 16 operates within the trough 13, to carry the material deposited therein toward the right hand end of the machine and discharge the same into any suitable receiver (not shown). The shaft 17 of this conveyer is journaled within bushings 18 that are mounted in the end walls 2.

A plurality of brackets 20 project forward from the rear wall 3 and support the upper ends of chutes 21. These chutes are inclined downward and forward, and their lower ends are supported upon a cross beam 22, that forms a part of the base frame 1. I have shown a chute 21 beneath each of the screen panels A, so that if I desire to use screens of different mesh, for the purpose of selecting different grades of material, I may preserve the separation of such material by conducting the respective grades into separate bins by way of the various chutes 21. It will be understood, however, that the chutes might be made wide enough to receive the graded material from any number of the panels, provided that they were of the same mesh.

25 are brackets, (one of which is shown in perspective in Fig. 6) and one of these brackets is located adjacent each end wall of the casing and is supported upon the cross member 26 of the base frame. Each of the brackets has an inclined head 27, one side of which is provided with a series of recesses 28, within any one of which is arranged to be secured one end of a rod 29, by means of a clamping plate 30 that is fastened to the recessed face of the bracket head by cap screws 31, it being understood that the two ends of the rod are clamped within corresponding recesses of the two brackets 25. It will be observed from Figs. 2 and 6 that the series of recesses 28, of each of the brackets 25, is arranged on a curve, and said curve is substantially concentric with the point of suspension of the upper ends of the panels A. This is for the obvious reason of preventing any appreciable variation in the location of such suspension point, through the adjustment of the rod 29, it being remembered that the lower ends of the panels are supported by the rod.

A shaft 35 is located above the previously mentioned brackets 20, and has its ends journaled in suitable bushings 31 (see Fig. 1) that are mounted in the end walls 2. Secured to the shaft 35, beneath the upper end of each of the panels A, is a pair of cams 37 (although there may be but one, or a greater number than two employed if desired). The cams are locked to the shaft by any suitable means, such as keys 38, and the high points of the cams of each pair are located in alinement. As will be explained farther along, the rotation of the shaft will cause the cams to impart vibrations to the screen-panels, and if it be desired to increase the frequency of vibration, the same may be accomplished by providing a greater number of high points on the cams, and running the shaft at the same speed. It is essential to have the high points of the cams of each screen-panel in accurate alinement to prevent twisting the panel; and in the employment of only one cam for each panel, the cam is located at the transverse center thereof.

Upon referring particularly to Figs. 4 and 5, it will be seen that each of the screen-panels A comprises a pair of side rails 40 that are connected together and spaced apart at their upper ends by a cross beam 41, and at their lower ends, by the transverse member 42, an intermediate transverse member 43 being located substantially halfway between the cross beam 41 and the transverse member 42. The cross beam 41 corresponds in depth to the side rails 40 and therefore forms an end wall for the screen panel, while the underneath surfaces of the transverse members 42 and 43 are spaced some distance from the screen proper, so that material may freely pass therebeneath. At each of its ends, the cross beam 41 is provided with a vertically disposed guideway 44, for the reception of a block 46 (preferably of hard wood), which is considerably longer than the vertical dimension of the beam. The lower end of each block 46 is arranged to rest upon the periphery of one of the cams 37, while its upper end is engaged by the forward end of a U-shaped leaf-spring 47, the opposite end of said spring being secured, by the bolts 48, to a lug 49 that projects from the side of the cross beam 41 adjacent each of the guideways 44. It is very essential that the bearing blocks 46 be yieldingly connected to the screen-panels, and I find that the construction just described, for accomplishing this end, is very satisfactory in practice, although I do not limit myself to such form of yielding connection, since other methods of including a spring or springs between the block and the panel can be employed without departing from the spirit of my invention.

To the lower end of each of the side rails 40 is secured a fitting 50, consisting of a plate 51, each plate being fastened to the respective rail by the bolts 53, and from the forward end of each plate there extends a U-shaped fork 52. The forks 52 embrace the rods 29, and a block 54 is clamped between the spaced ends of each fork, by means of a bolt 55, for the purpose of preventing the withdrawal of the fork from the rod. It will be observed that the space between the inner face of the block 54 and the opposed curved wall of the fork, is considerably greater than the diameter of the rod 29, wherefore the screen is capable of transverse as well as angular movement with respect to the rod. However, I prefer to provide means whereby this space may be varied, or eliminated entirely if desired, and for that reason I slot the forks 52, where the bolts 55 pass through them, so that said bolts, and the blocks 54 may be adjusted toward and from the crotch of the fork.

Applied to the underneath side of the panel frame above described, is screening material, designated $a$ in the drawings, and consisting of a bolting cloth, grit gauze, wire gauze, or other similar material. The edges of the screening material are clamped between the opposed surfaces of the aforesaid frame, and strips 56 that are secured to the frame, by screws 57.

The conveyer 10 is driven from any suitable source of power by a chain 60, which passes over a sprocket wheel 61 that is secured to the right hand end of the shaft 11, beyond the end wall 2. Intermediate the sprocket wheel 61 and said end wall, a second sprocket wheel 62 is fastened to the shaft, and a chain which passes about this sprocket wheel, passes over a similar wheel 63 that is secured to the shaft 35. Beyond the sprocket wheel 63, the shaft 35 carries another sprocket wheel 64, and a chain 65 passes over it and a sprocket wheel 66 that is secured to the protruding end of the shaft 17 of the lower conveyer 16.

In the use of the apparatus, material to be graded is introduced into the trough 7 from any source, such as driers, grinders, etc., as aforesaid, and is moved therealong by the conveyer 10 until it is precipitated through the various spouts 9 onto the screen-panels A. As the shaft 35, carrying the cams 37, is rotated in the direction of the arrow in Fig. 2, the upper ends of the panels will be elevated, and at the same time the panels will be drawn upward away from the rod 29, by the drag or friction of the blocks 46 upon the faces of the cams. As the high points of the cams pass the lower ends of the blocks 46, the panels will drop abruptly toward the shaft 35, and simultaneously move longitudinally toward the rod 29. This movement of the panels imparts a sliding motion to the material supported thereby. This not only aids in the screening of the material, but is especially advantageous in keeping the surface of the screen clean and prevents the screen from becoming clogged. Attention is also called to the fact that a very rapid vibration of comparatively long duration is imparted to the panels upon each rotation of each of the cams, by reason of the yielding connection between the panel-frames and the blocks 46, through which the upper ends of the panels are supported.

It is well known to those familiar with prevailing types of machines or apparatus that are used for grading or selecting such granular materials as fullers' earth and the like, that said machines or apparatus have numerous parts and bearings that are subjected to the wearing or abrading influence of dust and grit that are ever present during their operation. In my apparatus, practically the only wearing parts are those ends of the blocks 46 which engage the cams; and because of the simplicity of my construction, these blocks can be readily replaced in a very brief interval of time and at very slight expense, said blocks being preferably made of some cheap, hard wood, such as hickory. Furthermore, this can be done without stopping the operation of the apparatus. If any of the screens should become worn or injured from any cause, the affected panel can be repaired by opening the front of the casing and swinging the free end of the panel out of the machine when its underneath side will be exposed so that the strips 56 may be very easily removed and new screening material substituted for the old. The strips may then be replaced and the panel swung back to operative position. Should it be found necessary to entirely remove the panel for any reason, the same may be accomplished without suspending the operation of the apparatus, by simply removing the bolts 55 and the blocks 54, when the forks 52 may be withdrawn from the rod 29.

Attention is called to the construction of the chutes 9, that are pivoted between the depending sides 70 of the spouts 8. The deflecting surface of each of the chutes is corrugated the corrugations extending longitudinally of the chute, so as to effect a thorough distribution of the material across the screen-panel. A side plate 71 extends from each lateral edge of the deflecting surface of the chute, at right angles thereto, and the upper end of each side plate is enlarged and is pivoted at 72, to the adjacent depending side 70 of the spout.

A portion of the enlargement of each side plate 71 has its edge curved concentric to the pivot 72, and connecting the curved edges of the opposed side plates, is a segmental wall 73. When the chute is in normal position, as shown in full lines in Figs. 1 and 2, the segmental wall extends downward from the forward side of the spout 8, and free passage of material from the trough 7 to the screen panel is permitted. When it is desired to remove any one of the screen-panels, however, its respective chute 9 is swung into the position shown in dotted lines in Fig. 2, when the segmental wall 73 of such chute will act as a gate to close the spout 8 and thus shut off the flow of material therethrough.

Through the adjustment of the rod 29 within the brackets 25, the angle of inclination of the panels may be varied to regulate the speed at which the material passes downward across the screening surfaces.

While I have necessarily described my invention in detail, I do not propose to be limited to such details except as required by the terms of the annexed claims and rendered necessary by the prior state of the art.

Having thus described my invention, what I claim is:

1. The combination of a vibratory screen, a striker member, a spring connection between said member and the screen, and means to cause impacts against said member.

2. In apparatus of the character set forth, the combination of a screen, means loosely supporting the screen, a cam engaging device having a spring supporting connection to the screen, a member having a cam portion for coöperation with said device, and means for moving said member.

3. In apparatus of the character set forth, the combination of a screen, a member supporting one end of the screen and with respect to which the screen is capable of angular and lateral movement, adjustment means for varying the extent of such movement, a movable member whereon the opposite end of the screen is arranged to bear, the movable member being at a different elevation than the supporting member whereby the screen is inclined, the movable member having a cam portion for coöperation with the end of the screen opposite the supporting member, and means for moving the movable member to cause its cam portion to move in a direction toward the elevated end of the screen.

4. In apparatus of the character set forth, the combination of a screen, a member supporting one end of the screen and with respect to which the screen is capable of movement in a plane parallel to its own plane, adjustment means for varying the extent of such movement, a movable member whereon the opposite end of the screen is arranged to bear, the movable member being at a higher elevation than the supporting member whereby the screen is inclined downward toward the supporting member, the movable member having a cam portion for coöperation with the upper end of the screen, and means for moving the movable member to cause its cam portion to move in a direction toward the upper end of the screen.

5. In apparatus of the character set forth, the combination of a screen, a supporting member for one end of the screen and with respect to which the screen is capable of movement in its own plane, a cam engaging device yieldingly carried by the opposite end of the screen, a cam supported above the plane of the supporting member and in a position to be engaged by the cam engaging device, means for rotating said cam over in the direction of the upper end of the screen, and a bracket within which the supporting member is adjustable in an arc substantially concentric with a center defined by that end of the cam engaging device which traverses the cam.

6. In apparatus of the character set forth, the combination of a screen, means loosely supporting the same, a member carried by the screen and movable transversely of the plane thereof, a cam engaged by one end of said member, a spring having one of its ends secured to the screen and its opposite end resting upon that end of said member remote from the cam, and means for rotating the cam.

7. In apparatus of the character set forth, the combination of a screen, means for loosely supporting the same, a member carried by the screen and movable transversely of the plane thereof, a cam whereon one end of said member rests, a spring having one of its ends secured to the screen and its opposite end resting upon that end of said member remote from the cam, and means for rotating the cam.

8. In apparatus of the character set forth, the combination of a screen, means loosely supporting the same, a member carried by the screen and movable transversely of the plane thereof, a cam that is traversed by one end of said member, yielding connections between said member and the screen, and mechanism for rotating the cam.

9. In apparatus of the character set forth, the combination of a plurality of screens, means loosely supporting the corresponding ends of all of the screens, mechanism for supporting the opposite ends of the screens at a higher elevation than the aforesaid ends and for imparting to said screens vibrations, a trough extending over the upper ends of the screens, said trough being provided with a spout for each of the screens, a conveyer within said trough, a trough for receiving material from the lower ends of the screens, a conveyer within said second trough, and a chute for receiving the grated material from each of the screens.

10. In apparatus of the character set forth, the combination of a screen panel, a fork carried by one end thereof, a supporting rod to which said fork is applied, a block removably secured within the end of the fork whereby the fork is held against withdrawal from the rod, and a vibrating device whereon the opposite end of the panel rests.

11. In apparatus of the character set forth, the combination of a screen panel, a fork carried by one end thereof, a supporting rod to which said fork is applied, a block removably and adjustably secured within the end of the fork, and a vibrating device whereon the opposite end of the panel rests.

12. In apparatus of the character set forth, the combination of a screen panel, a supporting rod, means connecting one end of said panel to the rod, a vibrating device whereon the opposite end of the panel rests, and adjustment means whereby the elevation of the supporting rod with respect to the vibrating device may be varied, on an arc substantially concentric with respect to said device.

13. In apparatus of the character set forth, the combination of a screen panel, a supporting rod, means connecting one end of said panel to the rod, a cam engaging device yieldingly carried by the opposite end of the panel, a cam whereon said device is adapted to rest, and means for actuating said cam.

14. In apparatus of the character set forth, the combination of a screen panel, a supporting rod, means connecting one end of said panel to the rod, a cam engaging device yieldingly carried by the opposite end of the panel, a cam whereon said device is adapted to rest, and brackets for the aforesaid supporting rod, each bracket having a curved series of rod receiving recesses that is substantially concentric with a center defined by the bearing end of the aforesaid cam engaging device.

15. In apparatus of the character set forth, the combination of a screen panel, a supporting rod, connections between one end of the panel and said rod, a vibrating device whereon the opposite end of the panel is adapted to rest, and brackets for supporting the aforesaid rod, each of the brackets having a series of rod receiving recesses that is disposed at substantially right angles to the plane of the panel.

16. A panel frame of the character described comprising a pair of side rails, a cross beam connecting the corresponding ends of the rails, the lower side of the beam being in the plane of the underneath surface of the side rails, transverse members for connecting and spacing apart the side rails at points remote from the cross beam, the underneath edges whereof are above the plane of the underneath surfaces of the side rails, members applied to the underneath side of the side rails, and a piece of screening material having its edges clamped between the opposed surfaces of the rails and said members.

In testimony whereof, I hereunto affix my signature in the presence of two witnesses.

CHARLES C. RUPRECHT.

Witnesses:
Jo. W. Edmonds,
Bettie V. Herring.

Copies of this patent may be obtained for five cents each, by addressing the "Commissioner of Patents, Washington, D. C."